US008649313B2

(12) United States Patent
Lin et al.

(10) Patent No.: US 8,649,313 B2
(45) Date of Patent: Feb. 11, 2014

(54) MOBILE STATION, BASE STATION, TRANSMISSION METHOD AND COMPUTER STORAGE MEDIUM THEREOF

(75) Inventors: Yi-Ting Lin, Yonghe (TW); Tsung-Yu Tsai, Shanhua Town (TW); Jiun-Je Jian, Taipei (TW); Shiann-Tsong Sheu, Taipei (TW); Chih-Cheng Yang, Tainan (TW)

(73) Assignee: Institute for Information Industry, Taipei (TW)

( * ) Notice: Subject to any disclaimer, the term of this patent is extended or adjusted under 35 U.S.C. 154(b) by 978 days.

(21) Appl. No.: 12/757,949

(22) Filed: Apr. 9, 2010

(65) Prior Publication Data

US 2010/0254337 A1 Oct. 7, 2010

Related U.S. Application Data

(60) Provisional application No. 61/168,241, filed on Apr. 10, 2009, provisional application No. 61/168,243, filed on Apr. 10, 2009, provisional application No. 61/171,872, filed on Apr. 23, 2009, provisional application No. 61/174,504, filed on May 1, 2009.

(30) Foreign Application Priority Data

Apr. 7, 2010 (TW) ............................... 99110715 A

(51) Int. Cl.
*H04W 4/00* (2009.01)
(52) U.S. Cl.
USPC .......................................... 370/313; 370/328

(58) Field of Classification Search
USPC ................. 370/310–350; 375/240.26–240.27
See application file for complete search history.

(56) References Cited

U.S. PATENT DOCUMENTS

2008/0123585 A1* 5/2008 Granzow et al. .............. 370/320

FOREIGN PATENT DOCUMENTS

WO WO 2007/149729 A1 12/2007

OTHER PUBLICATIONS

Office Action rendered by the State Intellectual Property Office of China (SIPO) to the Chinese counterpart (CN Patent Application No. 201010161957.6) to the subject patent application on Jun. 25, 2012, 8 pages.

* cited by examiner

*Primary Examiner* — Andrew Chriss
*Assistant Examiner* — Kenan Cehic
(74) *Attorney, Agent, or Firm* — Skaar Ulbrich Macari, P.A.

(57) ABSTRACT

A mobile station (MS), a base station (BS), a transmission method and a computer storage medium thereof are provided. When the MS requests a bandwidth from the BS, it may generate a selected transmission sequence and a quick access message. The selected transmission sequence comprises pre-defined bit information (e.g., a flow identification, a size of the bandwidth or the like), and the quick access message comprises a station identification of the MS. The MS may transmit the transmission sequence and the quick access message to the BS in a frame so that the BS may allocate the bandwidth to the MS according to the size of the bandwidth, the station identification and the flow identification. Thereby, the amount of the control signals needed when the MS requests a bandwidth from the BS may be decreased.

21 Claims, 9 Drawing Sheets

| FID0 | FID1 | FID2 | ... | FID21 | FID22 | FID23 |
|------|------|------|-----|-------|-------|-------|
| S3 | S4 | S5 | ... | S0 | S1 | S2 |

| FID0 | FID1 | FID2 | ... | FID21 | FID22 | FID23 |
|------|------|------|-----|-------|-------|-------|
| S20 | S21 | S22 | ... | S17 | S18 | S19 |

MOBILE STATION, BASE STATION, TRANSMISSION METHOD AND COMPUTER STORAGE MEDIUM THEREOF

PRIORITY

This application claims priority benefit of U.S. Provisional Patent Application Nos. 61/168,241 filed on Apr. 10, 2009; 61/168,243 filed on Apr. 10, 2009; 61/171,872 filed on Apr. 23, 2009; and 61/174,504 filed on May 1, 2009. This application also claims priority to TW Patent Application No. 099110715, filed on Apr. 7, 2010. The disclosures of all the above-listed applications are hereby incorporated by reference in their entirety.

FIELD

The present invention relates to a mobile station, a base station, a transmission method and a computer storage medium thereof. More particularly, the present invention relates to a mobile station, a base station, a transmission method and a computer storage medium thereof that are configured to transmit a selected transmission sequence and a quick access message in a frame.

BACKGROUND

With development of the wireless communication technologies, use of various wireless signal transmission apparatuses such as mobile phones, personal digital assistants (PDAs) and notebook computers has become widespread in people's daily life. Accordingly, network services realized through the wireless signal transmission apparatuses become also increasingly diversified. For example, one can download music pieces from a network or watch online movies in real time by use of a wireless signal transmission apparatus. These network services not only provide more convenient network applications, but also increase the added value of the wireless signal transmission apparatuses.

Generally, the aforesaid wireless signal transmission apparatuses can be carried about by users, so they can be collectively classified as mobile stations (MSs). When an MS desires to execute or open a new network service, it needs to request a new bandwidth from a base station (BS) to which it connects in order to transmit information necessary for the network service. Specifically, referring to FIG. 1, a schematic view of a WiMAX wireless network 1 is shown therein. The WiMAX wireless network 1 comprises a BS 11 and an MS 13. When the MS 13 desires to request a bandwidth allocation from the BS 11, the MS 13 transmits a bandwidth request signal 130 to the BS 11 so that the BS 11 learns that a bandwidth allocation is requested by an MS. However, the bandwidth request signal 130 does not comprise a size of the bandwidth that is requested and a station identification of the MS 13, so currently the BS 11 is only able to transmit an uplink grant signal 110 at first.

Then, upon receiving the uplink grant signal 110, the MS 13 learns that the BS 11 has agreed to the request of uplink transmission, so the MS 13 further transmits a bandwidth request message 132 comprising a size of the requested bandwidth and the station identification of the MS 13. Upon receiving the bandwidth request message 132, the BS 11 learns that it is the MS 13 that is requesting the bandwidth allocation and also learns the size of the requested bandwidth. Then, the BS 11 further determines whether the bandwidth can be allocated to the MS 13 according to current resource usage conditions of the WiMAX wireless network 1. If the bandwidth can be allocated, the BS 11 transmits an allocation grant signal 112 to the MS 13 which, upon receiving the allocation grant signal 112, then conducts data transmissions 134 with the BS 11 through the bandwidth thus obtained.

As described above, a bandwidth allocation between the BS 11 and the MS 13 can be accomplished through at least four exchanges of control signals in four frames. In the modern society where network services become increasingly diversified, if the MS requests bandwidth in order to execute massive network services simultaneously, an excessive amount of network resources would be wasted in transmission of control signals, thus leading to degradation in overall transmission performance of the WiMAX wireless network 1.

Accordingly, an there is a need in the art to provide a solution that allows an MS to request a bandwidth allocation from a BS in an efficient way so as to improve overall transmission performance of the wireless network.

SUMMARY

An objective of certain embodiments of the present invention is to provide a mobile station (MS), a base station (BS), a transmission method and a computer storage medium thereof. When the MS requests a bandwidth from the BS, the MS may transmit a selected transmission sequence and a quick access message to the BS simultaneously in a frame so that the BS can determine whether to allocate the bandwidth to the MS according to the selected transmission sequence and the quick access message.

To achieve the aforesaid objective, the MS of the present invention comprises a storage, a microprocessor and a transceiver. The microprocessor is electrically connected to the storage and the transceiver respectively. The storage is configured to store transmission information and a sequence generating function. The microprocessor is configured to select a selected transmission sequence from a plurality of transmission sequences according to the sequence generating function, generate a quick access message according to the transmission information and embed pre-defined bit information into the selected transmission sequence according to the transmission information. The quick access message at least comprises a station identification (ID) corresponding to the MS. The transceiver is configured to transmit the selected transmission sequence and the quick access message to the BS in a frame so that the BS can allocate the bandwidth to the MS according to the pre-defined bit information and the station ID.

To achieve the aforesaid objective, the transmission method for an MS of certain embodiments of the present invention comprises the following steps of: enabling the microprocessor to select a selected transmission sequence from a plurality of transmission sequences according to the sequence generating function; enabling the microprocessor to generate a quick access message according to a sequence generating function of the transmission information, wherein the quick access message at least comprises a station ID corresponding to the MS; enabling the microprocessor to embed pre-defined bit information into the selected transmission sequence; and enabling the transceiver to transmit the selected transmission sequence and the quick access message to the BS in a frame so that the BS can allocate the bandwidth to the MS according to the pre-defined bit information and the station ID.

To achieve the aforesaid objective, the computer storage medium of certain embodiments of the present invention stores a program for executing a transmission method for an MS. The program comprises the following codes: a code A for enabling the microprocessor to select a selected transmission sequence from a plurality of transmission sequences according to the sequence generating function; a code B for enabling the microprocessor to generate a quick access message according to the transmission information, wherein the quick access message at least comprises a station ID corresponding to the MS; a code C for enabling the microprocessor to embed pre-defined bit information into the selected transmission sequence; and a code D for enabling the transceiver to transmit the selected transmission sequence and the quick access message to the BS in a frame so that the BS can allocate the bandwidth to the MS according to the pre-defined bit information and the station ID.

To achieve the aforesaid objective, the BS of certain embodiments of the present invention comprises a storage, a transceiver and a microprocessor. The microprocessor is electrically connected to the storage and the transceiver. The storage is configured to store a sequence generating function and network resource conditions of the WiMAX wireless network. The transceiver is configured to receive the selected transmission sequence and the quick access message. The microprocessor is configured to: decode the selected transmission sequence according to the sequence generating function to learn that a station having the pre-defined bit information is requesting the bandwidth; decode the quick access message to obtain the station ID; determine that the station is the MS according to the station ID; and determine that the bandwidth can be allocated to the MS according to the network resource conditions.

To achieve the aforesaid objective, the transmission method for a BS of certain embodiments of the present invention comprises: (A) enabling the transceiver to receive the selected transmission sequence and the quick access message; (B) enabling the microprocessor to decode the selected transmission sequence according to the sequence generating function to learn that a station having the pre-defined bit information is requesting the bandwidth; (C) enabling the microprocessor to decode the quick access message to obtain the station ID; (D) enabling the microprocessor to determine that the station is the MS according to the station ID; and (E) enabling the microprocessor to determine that the bandwidth can be allocated to the MS according to the network resource conditions.

To achieve the aforesaid objective, another computer storage medium of certain embodiments of the present invention stores a program for executing a transmission method for a BS. The program comprises the following codes: a code A for enabling the transceiver to receive the selected transmission sequence and the quick access message; a code B for enabling the microprocessor to decode the selected transmission sequence according to the sequence generating function to learn that a station having the pre-defined bit information is requesting the bandwidth; a code C for enabling the microprocessor to decode the quick access message to obtain the station ID; a code D for enabling the microprocessor to determine that the station is the MS according to the station ID; and a code E for enabling the microprocessor to determine that the bandwidth can be allocated to the MS according to the network resource conditions.

According to the above description, the present invention can transmit a selected transmission sequence and a quick access message simultaneously in a frame to save the amount of control signals that need to be transmitted when a bandwidth is requested. This allows for an efficient use of the network resources and improves the overall transmission performance of the WiMAX wireless network, thereby addressing the shortcomings of the prior art.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
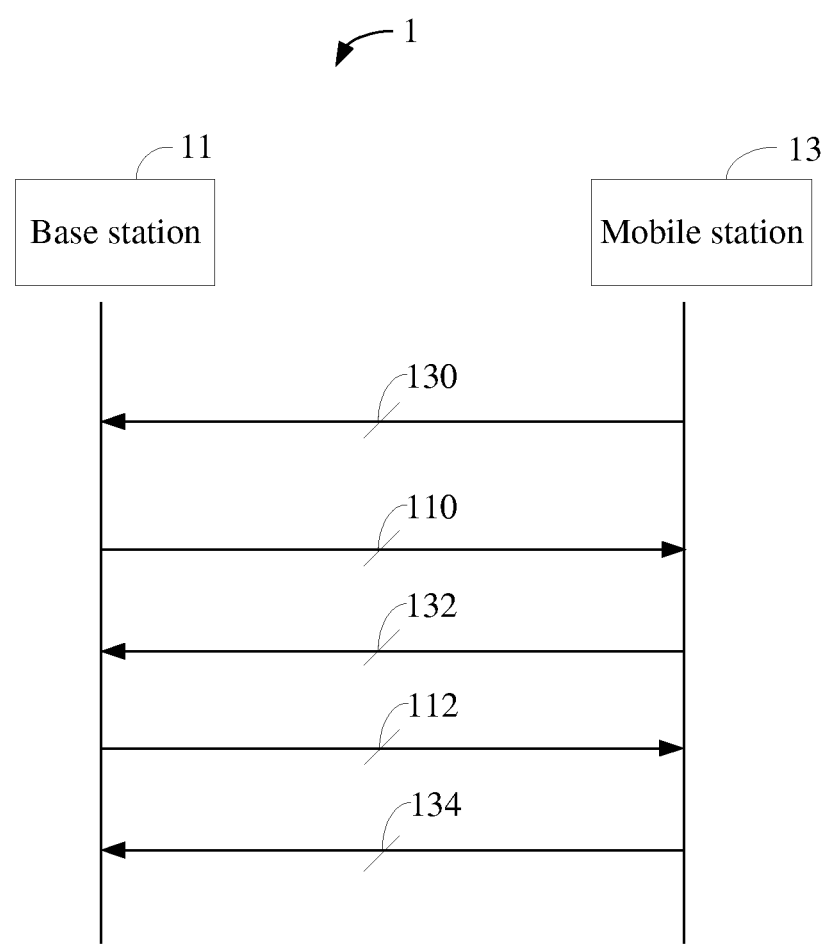
FIG. 1 is a schematic view of a conventional WiMAX wireless network.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to example embodiments thereof. However, these example embodiments are not intended to limit the present invention to any specific environment, applications or particular implementations described in these example embodiments. Therefore, description of these example embodiments is only for purpose of illustration rather than limitation. It should be appreciated that, in the following example embodiments and the attached drawings, elements unrelated to the present invention are omitted from depiction; and dimensional relationships among individual elements in the attached drawings are illustrated only for ease of understanding, but not to limit the actual scale.

Figure 2:
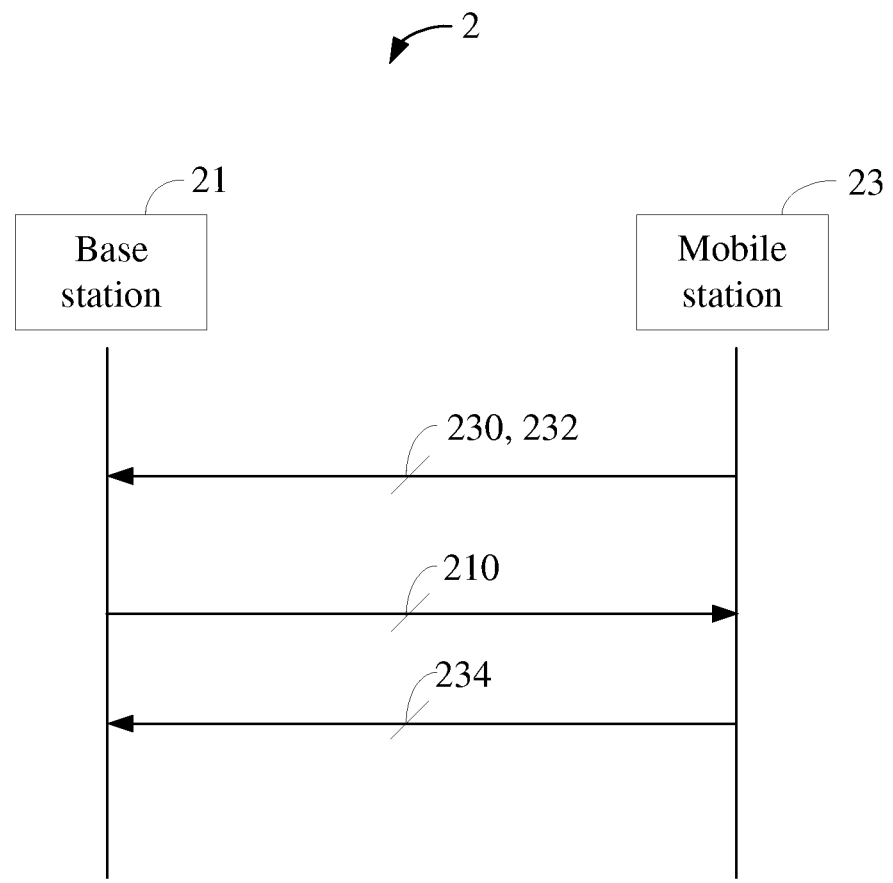
FIG. 2 is a schematic view of a first example embodiment of the present invention.

A first example embodiment of the present invention is shown in FIG. 2, which is a schematic view of a WiMAX wireless network 2. The WiMAX wireless network 2 comprises a BS 21 and an MS 23. It shall be noted that, in this embodiment, only one BS 21 and one MS 23 are illustrated as an example; however, the present invention is not merely limited thereto, and the BS 21 may also perform a subsequent bandwidth request procedure with a plurality of MSs. The MS 23 may be any commercially available electronic products with WiMAX wireless network transmission functionality.

When the MS 23 is to execute a network service, it needs to request a bandwidth from the BS 21. Accordingly, the MS 23 generates a selected transmission sequence 230 and a quick access message 232, and transmits the selected transmission sequence 230 and the quick access message 232 to the BS 21 simultaneously in a frame. It shall be appreciated that, in this embodiment, the selected transmission sequence 230 comprises pre-defined bit information (e.g., a flow identification (ID), a size of the bandwidth or the like), and the quick access message 232 comprises a station ID corresponding to the MS 23; however, the present invention is not merely limited thereto, and in other embodiments, the size of the bandwidth may also be incorporated into the quick access message 232 depending on practical requirements.

Upon receiving the selected transmission sequence 230 and the quick access message 232, the BS 21 learns that there is a station requesting a bandwidth, and further from the station ID comprised in the quick access message 232 and the pre-defined bit information carried by the selected transmission sequence 230, learns that it is the MS 23 that is requesting the bandwidth and the size of the bandwidth. Next, the BS 21 determines whether to allocate the bandwidth to the MS 23 according to the network resource conditions of the WiMAX wireless network 2. If it is determined to allocate the bandwidth to the MS 23, then the BS 21 further generates and transmits a grant signal 210 to the MS 23 to inform the MS 23 that the bandwidth it requested has been allocated. Upon receiving the grant signal 210, the MS 23 can perform a data transmission 234 with the BS 21 through the bandwidth thus allocated.

Figure 3:
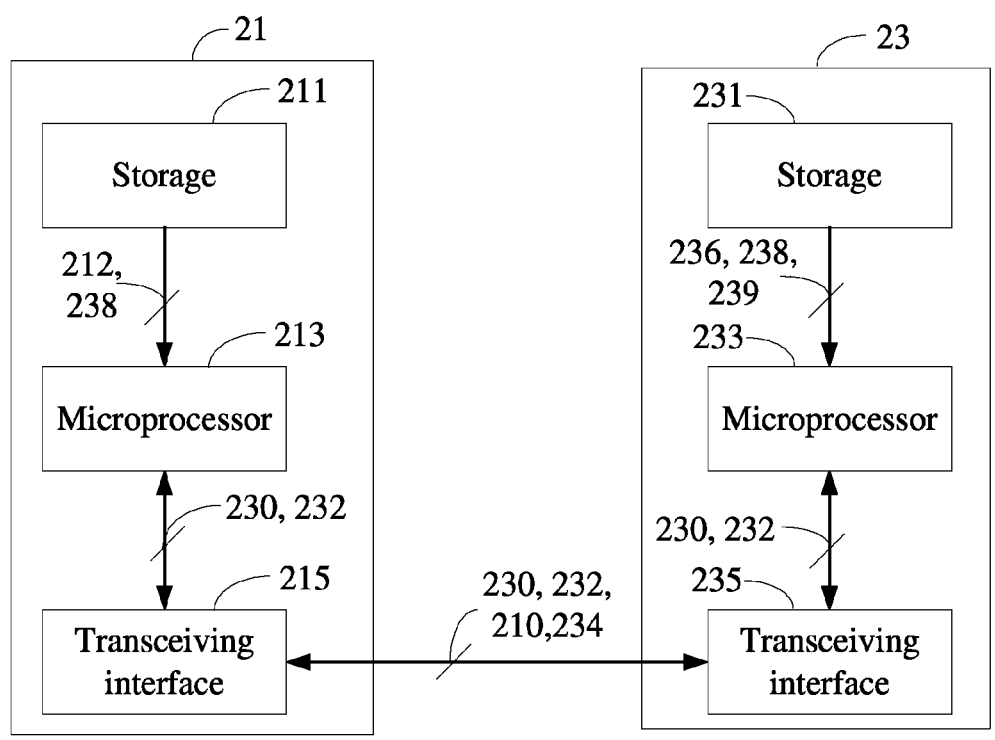
FIG. 3 is a schematic view of a BS and an MS of the first example embodiment.

To illustrate how the MS 23 communicates with the BS 21 to obtain the bandwidth allocation more clearly, a schematic view of the MS 23 and the BS 21 is shown in FIG. 3. As can be seen from FIG. 3, the MS 23 comprises a storage 231, a microprocessor 233 and a transceiver 235. The microprocessor 233 is electrically connected to the storage 231 and the transceiver 235. The BS 21 comprises a storage 211, a microprocessor 213 and a transceiver 215. The microprocessor 213 is electrically connected to the storage 211 and the transceiver 215. Hereinafter, functions of the individual modules of the MS 23 and the BS 21 will be described.

The storage 231 of the MS 23 is configured to store a sequence generating function 238 transmission information 236 that comprises information needed by the MS 23 in transmission, including a flow ID, a station ID, frame information, a plurality of transmission sequences and so on. Unlike the prior art, the transmission information 236 further comprises a sequence generating function or a first sequence correspondence relationship, functions of which will be described later herein.

When the MS 23 is to request a bandwidth from the BS 21, the microprocessor 233 of the MS 23 selects a selected transmission sequence 230 from a plurality of transmission sequences according to the sequence generating function 238 in order to obviate transmission collisions with other MSs during the transmission process. The selected transmission sequence may be viewed as a bandwidth request preamble.

In more detail, a frame of the WiMAX wireless network may comprise a plurality of transmission sequences orthogonal to each other in order to obviate transmission interference. However, if the MS 23 happens to select a same transmission sequence from the frame during a number of selection processes, transmission interference would still occur. Hence, to effectively mitigate the transmission interference, the sequence generating function 238 is determined as follows:

$$RN = (a \times \text{current\_state} + p) \bmod m$$

where RN is a serial No. of the selected transmission sequence 230, a is a first predetermined parameter, current_state is information shared by the BS 21 and the MS 23, which may be a station ID of the MS 23, a serial No. of the frame, a flow ID of the MS 23, or a combination thereof, p is a second predetermined parameter and m is a total number of the transmission sequences.

Figure 4:
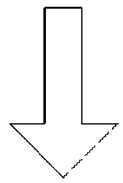
FIG. 4 is a schematic view illustrating a sequence correspondence relationship.

Furthermore, the storage 231 of the MS 23 further stores a first sequence correspondence relationship 239. The microprocessor 233 of the MS 23 may also select the selected transmission sequence 230 from a plurality of transmission sequences according to the first sequence correspondence relationship 239. In more detail, a schematic view of the sequence correspondence relationship is shown in FIG. 4. In this embodiment, the first sequence correspondence relationship 239 is configured to represent the correspondence relationship between flow IDs and a plurality of transmission sequences. In other embodiments, the first sequence correspondence relationship 239 may be configured to represent the correspondence relationship between other information and a plurality of transmission sequences.

In FIG. 4, FIDN represents a flow ID with a serial No. of N (N=0~23), and SM represents a transmission sequence with a serial No. of M (M=0~23). The first sequence correspondence relationship 239 is that FID0 corresponds to S3, FID1 corresponds to S4, FID2 corresponds to S5, . . . , FID21 corresponds to S0, FID22 corresponds to S1 and FID23 corresponds to S2. In other words, the transmission sequence S0 to the transmission sequence S23 are cyclically arranged in the first sequence correspondence relationship 239.

In order to decrease possibility of selecting a same transmission sequence, the microprocessor 233 of the MS 23 conducts a shifting process on the first sequence correspondence relationship 239 according to a total number of the transmission sequences (which is 24 in this embodiment) and the information shared by the BS 21 and the MS 23 so as to generate a second sequence correspondence relationship. In more detail, when the shared information is 113, the microprocessor 233 will conduct an operation that divides 113 by the total number of the transmission sequences and takes a remainder thereof; i.e., 113 mod 24 is equal to 17. Then, the microprocessor 233 shifts the first sequence correspondence relationship 239 by 17 units to generate the second sequence correspondence relationship. The second sequence corresponding relationship is that FID0 corresponds to S20, FID1 corresponds to S21, FID2 corresponds to S22, . . . , FID21 corresponds to S17, FID22 corresponds to S18 and FID23 corresponds to S19.

Then, the microprocessor 233 selects the selected transmission sequence from the transmission sequences according to the second sequence corresponding relationship and the flow ID of the MS 23. For example, if the flow ID of the MS 23 is FID0, the selected transmission sequence will be the transmission sequence of S20. Likewise, if the flow ID of the MS 23 is FID21, the selected transmission sequence will be the transmission sequence of S17.

Once the selected transmission sequence 230 is selected, the microprocessor 233 of the MS 23 can embed pre-defined bit information (e.g., a flow ID, a size of the bandwidth or the like) into the selected transmission sequence 230 according to the transmission information 236 and generate a quick access message 232 according to the transmission information 236. The quick access message 232 at least comprises a station ID corresponding to the MS 23.

Additionally, to ensure that the quick access message 232 is not corrupted during the transmission process, the microprocessor 233 may conduct a cyclic redundancy check (CRC) operation on the quick access message 232 to generate an MS CRC code and embed the MS CRC code into the quick access message 232 so that the BS 21 can verify if the quick access message 232 is intact according to the MS CRC code. How the BS 21 verifies integrity of the quick access message 232 according to the MS CRC code will be described herein later.

Further, after generation of the quick access message 232 comprising the MS CRC code and the selected transmission sequence 230, the transceiver 235 transmits the selected transmission sequence 230 and the quick access message 232 to the BS 21 in a frame.

The storage 211 of the BS 21 is configured to store network resource conditions 212 of the WiMAX wireless network 2 and the sequence generating function 238. The transceiver 215 of the BS 21 is configured to receive the selected transmission sequence 230 and the quick access message 232. The microprocessor 213 of the BS 21 determines whether the selected transmission sequence 230 can be decoded according to the sequence generating function 238; if the answer is no, then a first non-acknowledgement (NAK) signal is transmitted by the microprocessor 213 to the MS 23 through the transceiver 215 so that, in response to the first NAK signal and according to the aforesaid action, the MS 23 can re-generate and re-transmit a quick access message comprising the MS CRC code and a selected transmission sequence comprising the pre-defined bit information to the BS 21.

If the selected transmission sequence 230 can be decoded according to the sequence generating function 238 by the microprocessor 213 of the BS 21, it can be learned that a station having the pre-defined bit information (e.g., a flow ID, a size of the bandwidth or the like) is requesting the bandwidth. It shall be noted that, at this point, the BS 21 only learns that there is a station requesting the bandwidth, but doesn't know it is the MS 23 that is requesting the bandwidth. Next, the microprocessor 213 of the BS 21 determines whether the quick access message 232 can be decoded. If the answer is no, then the microprocessor 213 transmits a second NAK signal to the MS 23 through the transceiver 215 so that, in response to the second NAK signal, the MS 23 transmits a bandwidth request signal at least comprising a size of the requested bandwidth and a station ID corresponding to the MS 23 to the BS 21.

Next, the microprocessor 213 of the BS 21 determines whether the bandwidth request signal can be decoded. If the answer is no, then the microprocessor 213 transmits a third NAK signal to the MS 23 through the transceiver 215 so that, in response to the third NAK signal, the MS 23 re-transmits a bandwidth request signal at least comprising a size of the requested bandwidth and a station ID corresponding to the MS 23 to the BS 21.

If the bandwidth request signal can be decoded by the microprocessor 213 of the BS 21, then from the station ID comprised in the bandwidth request signal, the microprocessor 213 can learn that it is the MS 23 that is requesting the bandwidth. Subsequently, according to the network resource conditions 212 and the size of the requested bandwidth comprised in the bandwidth request signal, the microprocessor 213 of the BS 21 determines whether there are sufficient network resources available for allocating the bandwidth size requested by the MS 23. If the answer is yes, then the microprocessor 213 of the BS 21 transmits a grant signal 210 to the MS 23 through the transceiver 215 to inform the MS 23 that the bandwidth can now be used to perform a data transmission 234 with the BS 21.

If the quick access message 232 can be decoded, then from the station ID comprised in the quick access message 232, the microprocessor 213 of the BS 21 can learn that it is the MS 23 that is requesting the bandwidth. Thereafter, according to the network resource conditions 212 and the size of the requested bandwidth, the microprocessor 213 of the BS 21 determines whether there are sufficient network resources available for allocating the bandwidth size requested by the MS 23. If the answer is yes, then the microprocessor 213 of the BS 21 transmits a grant signal 210 to the MS 23 through the transceiver 215 to inform the MS 23 that the bandwidth can now be used to perform a data transmission 234 with the BS 21.

Additionally, upon receiving the quick access message 232, the microprocessor 213 of the BS 21 may conduct a CRC operation on the quick access message 232 to generate a BS CRC code and determine whether the MS CRC code and the BS CRC code are identical to each other. If the answer is yes, then it means that the quick access message 232 is intact; otherwise, the quick access message 232 is not intact. Whether this checking operation is conducted depends on practical requirements.

Furthermore, upon generating the MS CRC code, the microprocessor 233 of the MS 23 may further conduct an exclusive-OR (XOR) operation on the MS CRC code and the station ID of the MS 23 to generate an MS XOR CRC code and embed the MS XOR CRC code into the quick access message 232. Upon receiving the quick access message 232, the BS 21 retrieves the MS XOR CRC code and conducts an XOR operation on the MS XOR CRC code according to the station ID already registered in the BS 21 so as to generate a BS CRC code. Then, the BS 21 conducts an inverse CRC operation on the BS CRC code to retrieve the flow ID embedded in the quick access message 232. If the flow ID that is retrieved is within a reasonable range, then it means that the quick access message 232 is intact; otherwise, if the flow ID that is retrieved is beyond the reasonable range, then the microprocessor 213 of the BS 21 re-conducts the operation on another station ID already registered in the BS 21 until the flow ID that is retrieved is within the reasonable range.

Additionally, formats of the quick access message 232 used in this embodiment may be as shown in Table 1 to Table 9 below:

TABLE 1

| | Length (bit) | Description | | Note |
|---|---|---|---|---|
| Station ID | 12 | Identifies an MS | | |
| Information | 4 | Size of a requested bandwidth (4-bits) | Identifies the number of (LRUs × lowest MCS) requested by a flow | For non-aGPS connections |
| | | QoS Parameter Set Flag (for aGPS) (1-bit, 3-bits reserved) | For switching of the QoS parameter sets of aGPS 0: Primary QoS parameter set 1: Secondary QoS parameter set | For aGPS connections |

TABLE 2

| | Length (bit) | Description | | Note |
|---|---|---|---|---|
| Temporary ID | 10 | Identifies an MS and generated by fun(STID) | | |
| Information | 2 | Size of a requested bandwidth (2-bits) | Identifies the number of (LRUs × lowest MCS) requested by a flow | For non-aGPS connections |
| | | QoS Parameter Set Flag (for aGPS) (1-bit, 1-bit reserved) | For switching of the QoS parameter sets of aGPS 0: Primary QoS parameter set 1: Secondary QoS parameter set | For aGPS connections |

TABLE 3

| | Length (bit) | Description | | Note |
|---|---|---|---|---|
| Information | 4 | Size of a requested bandwidth (4-bits) | Identifies the number of (LRUs × lowest MCS) requested by a flow | For non-aGPS connections |
| | | QoS Parameter Set Flag (for aGPS) (1-bit, 3-bits reserved) | For switching of the QoS parameter set of aGPS 0: Primary QoS parameter set 1: Secondary QoS parameter set | For aGPS connections |
| CRC | 8 | Generated by the MS information and the Station ID | | |

TABLE 4

| | Length (bit) | Description | | Note |
|---|---|---|---|---|
| least significant bit (LSB) of Station ID | 6 | Identifies an MS | | |
| Information | 4 | Size of a requested bandwidth (4-bits) | Identifies the number of (LRUs × lowest MCS) requested by a flow | For non-aGPS connections |
| | | QoS Parameter Set Flag (for aGPS) (1-bit, 3-bits reserved) | For switching of the QoS parameter set of aGPS 0: Primary QoS parameter set 1: Secondary QoS parameter set | For aGPS connections |
| CRC | 6 | Generated by the MS information and the Station ID | | |

TABLE 5

| | Length (bit) | Description | | Note |
|---|---|---|---|---|
| Information | 2 | Size of a requested bandwidth (2-bits) | Identifies the number of requested by a flow. The associated parameter is negotiated during flow establishing or service change | For non-aGPS connections |
| | | QoS Parameter Set Flag (for aGPS) (1-bit, 1-bit reserved) | For switching of the QoS parameter set of aGPS 0: Primary QoS parameter set 1: Secondary QoS parameter set | For aGPS connections |
| Temporary ID | 10 | Generated by fun (STID) | | |
| Check Format | 2 | Generated by an MS's 10-bit LSB STID or fun (STID) and information | | |

TABLE 6

| | Length (bit) | Description | | Note |
|---|---|---|---|---|
| Information | 3 | Size of a requested bandwidth (3-bits) | Identifies the number of requested by a flow. The associated parameter is negotiated during flow establishing or service change | For non-aGPS connections |

TABLE 6-continued

| | Length (bit) | Description | Note |
|---|---|---|---|
| | | QoS Parameter Set Flag (for aGPS) (1-bit, 2-bits reserved) | For switching of the QoS parameter set of aGPS<br>0: Primary QoS parameter set<br>1: Secondary QoS parameter set | For aGPS connections |
| Temporary ID | 10 | Generated by fun (STID) | |
| Check Format | 1 | Generated by an MS's 10-bit LSB STID or fun (STID) and information | |

TABLE 7

| | Length (bit) | Description | | Note |
|---|---|---|---|---|
| Information | 2 | Size of a requested bandwidth (2-bits) | Identifies the number of requested by a flow. The associated parameter is negotiated during flow establishing or service change | For non-aGPS connections |
| | | QoS Parameter Set Flag (for aGPS) (1-bit, 1-bit reserved) | For switching of the QoS parameter set of aGPS<br>0: Primary QoS parameter set<br>1: Secondary QoS parameter set | For aGPS connections |
| Temporary ID | 11 | Generated by fun (STID) | | |
| Check Format | 1 | Generated by an MS's 10-bit LSB STID or fun (STID) and information | | |

TABLE 8

| | Length (bit) | Description | | Note |
|---|---|---|---|---|
| Information | 2 | Size of a requested bandwidth (2-bits) | Identifies the number of requested by a flow. The associated parameter is negotiated during flow establishing or service change | For non-aGPS connections |
| | | QoS Parameter Set Flag (for aGPS) (1-bit, 1-bit reserved) | For switching of the QoS parameter set of aGPS<br>0: Primary QoS parameter set<br>1: Secondary QoS parameter set | For aGPS connections |
| Temporary ID | 10 | Generated by fun (STID) | | |
| Check Format | 4 | Generated by an MS's 10-bit LSB STID or fun (STID) and information | | |

TABLE 9

| | Length (bit) | Description | |
|---|---|---|---|
| Temporary ID | 10 | A temporary ID is mapped to an active STID. The mapping may be a function or assigned by the BS | |
| Symmetric code | 1 | Calculated by an MS's 10-bit temporary ID and 1-bit bandwidth request information carried in the quick access message | |
| Bandwidth request information | 2 (1 bit is carried in the quick access message, and 1 bit is hided in the bandwidth request preamble) | Size of a requested bandwidth (2-bits) | Identifies the number of requested by QoS ID. The associated parameter is negotiated during flow establishing or service change |
| | | Identify the requested GPS flow (for aGPS flow only) | For switching of the QoS parameter sets of aGPS |

A second example embodiment of the present invention is shown in FIGS. 5A-5E, which illustrate a flowchart of a transmission method for a WiMAX wireless network. The WiMAX wireless network, which may be the WiMAX wireless network as described in the first embodiment, comprises a BS and an MS. The MS comprises a storage, a microprocessor and a transceiver. The microprocessor of the MS is electrically connected to the storage and the transceiver respectively. The storage of the MS is configured to store transmission information and a sequence generating function. The BS comprises a storage, a transceiver and a microprocessor. The microprocessor of the BS is electrically connected to the storage and the transceiver. The storage of the BS is configured to store network resource conditions of the WiMAX wireless network and a sequence generating function. Currently, the MS is to request a bandwidth from the BS.

Furthermore, the transmission method described in the second example embodiment may be implemented by a computer storage medium. When the computer storage medium is loaded into the BS and the MS and a plurality of codes contained in the computer storage medium is executed, the transmission method described in the second embodiment can be accomplished. This computer storage medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 5A:
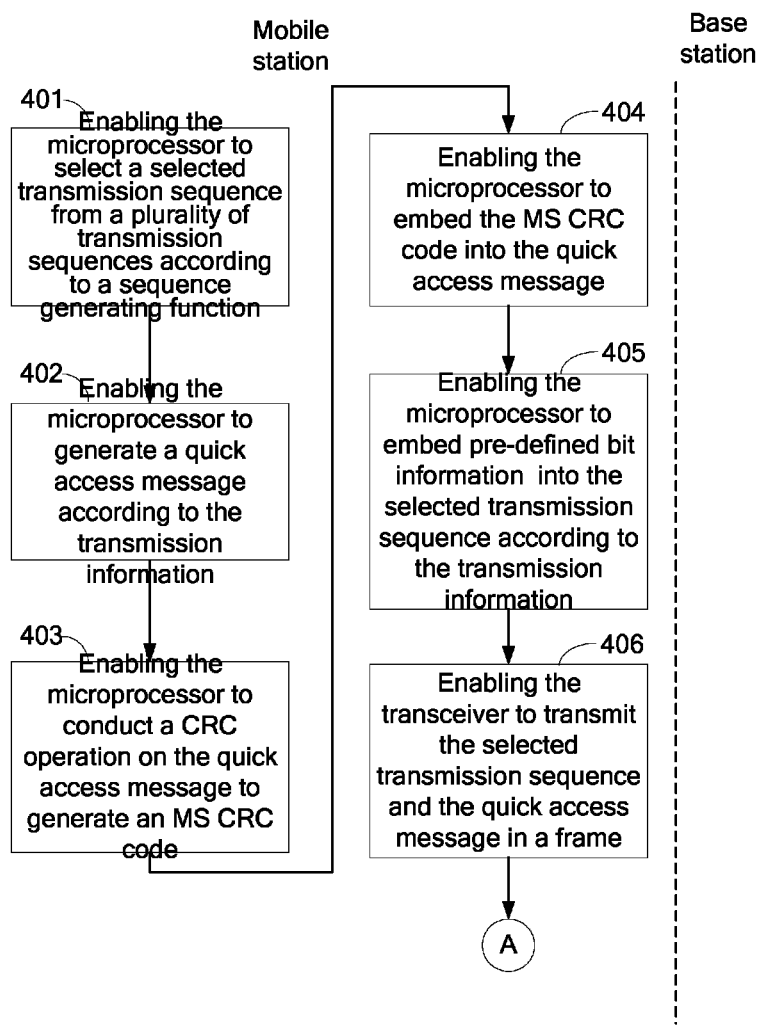
FIGS. 5A-5E are a flowchart of a second example embodiment of the present invention.

Firstly, referring to FIG. 5A, step 401 is executed to enable the microprocessor to select a selected transmission sequence from a plurality of transmission sequences according to the sequence generating function. Then, step 402 is executed to enable the microprocessor to generate a quick access message according to the transmission information. The quick access message at least comprises a station ID corresponding to the MS. Step 403 is executed to enable the microprocessor to conduct a cyclic redundancy check (CRC) operation on the quick access message to generate an MS CRC code.

Figure 5B:
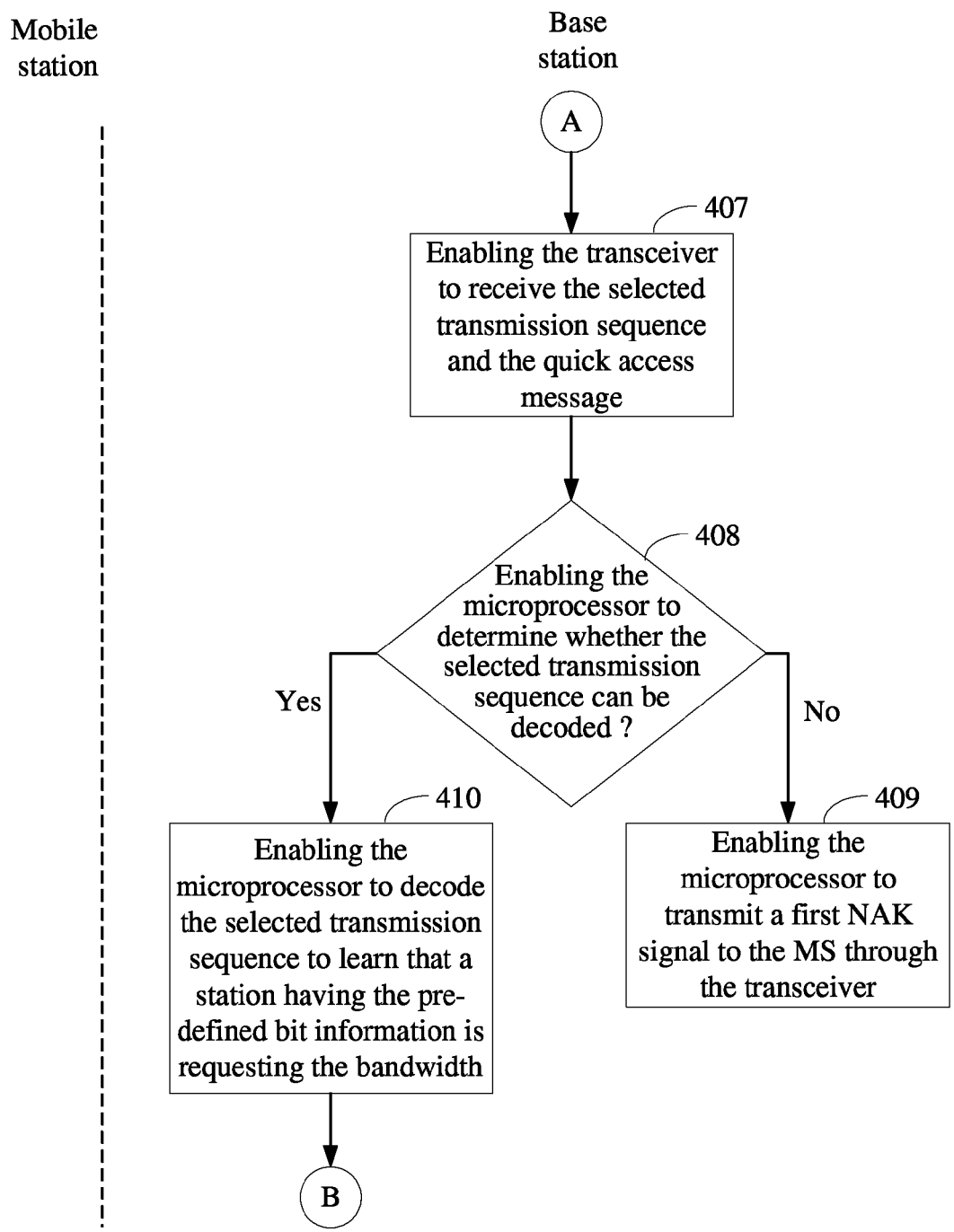

Next, step 404 is executed to enable the microprocessor to embed the MS CRC code into the quick access message, and step 405 is executed to enable the microprocessor to embed pre-defined bit information (e.g., a flow ID, a size of the bandwidth or the like) into the selected transmission sequence according to the transmission information. Afterwards, step 406 is executed to enable the transceiver to transmit the selected transmission sequence and the quick access message in a frame. Referring next to FIG. 5B, step 407 is executed to enable the transceiver to receive the selected transmission sequence and the quick access message. Thereafter, step 408 is executed to enable the microprocessor to determine whether the selected transmission sequence can be decoded according to the sequence generating function. If the answer is no, then step 409 is executed to enable the microprocessor to transmit a first non-acknowledgement (NAK) signal to the MS through the transceiver so that, in response to the first NAK signal, the MS re-generates and re-transmits a quick access message comprising the MS CRC code and a selected transmission sequence comprising the flow ID to the BS.

Figure 5C:
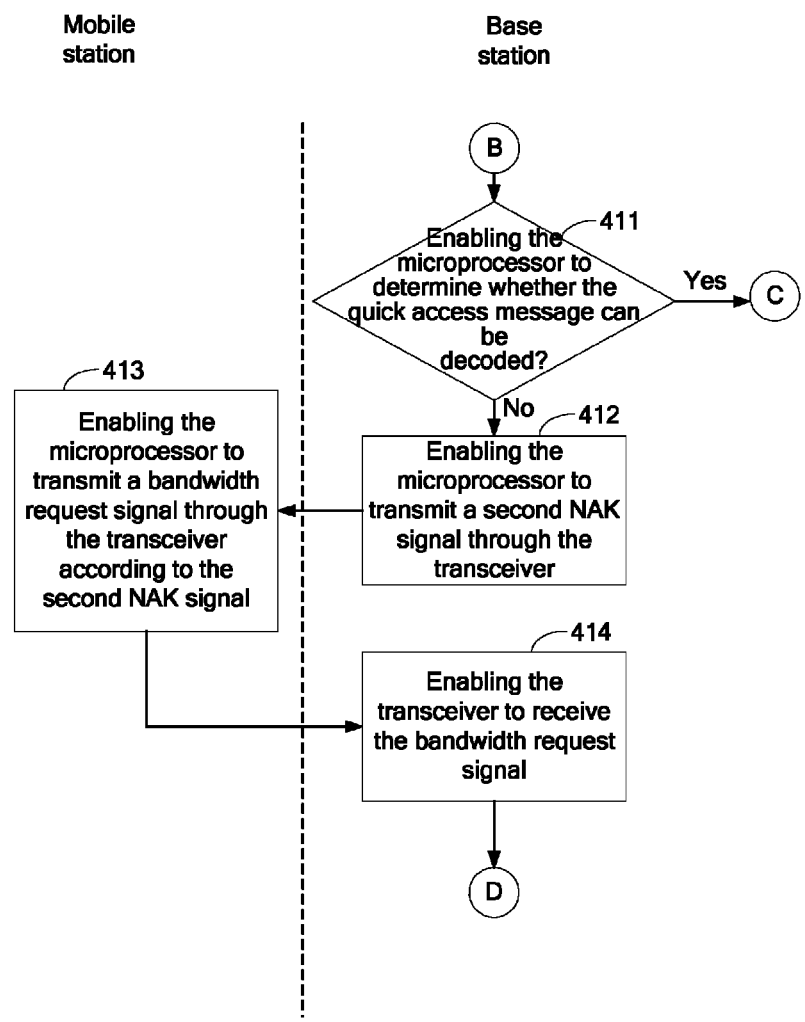

Otherwise, if the selected transmission sequence can be decoded, then step 410 is executed to enable the microprocessor to decode the selected transmission sequence to learn that a station having the pre-defined bit information (e.g., a flow ID, a size of the bandwidth or the like) is requesting the bandwidth. Referring to FIG. 5C, step 411 is executed to enable the microprocessor to determine whether the quick access message can be decoded. If the answer is no, then step 412 is executed to enable the microprocessor to transmit a second NAK signal to the MS through the transceiver. Subsequently, step 413 is executed to enable the microprocessor of the MS to, in response to the second NAK signal, transmit a bandwidth request signal at least comprising a size of the requested bandwidth and a station ID corresponding to the MS. Then, step 414 is executed to enable the transceiver of the BS to receive the bandwidth request signal.

Figure 5D:
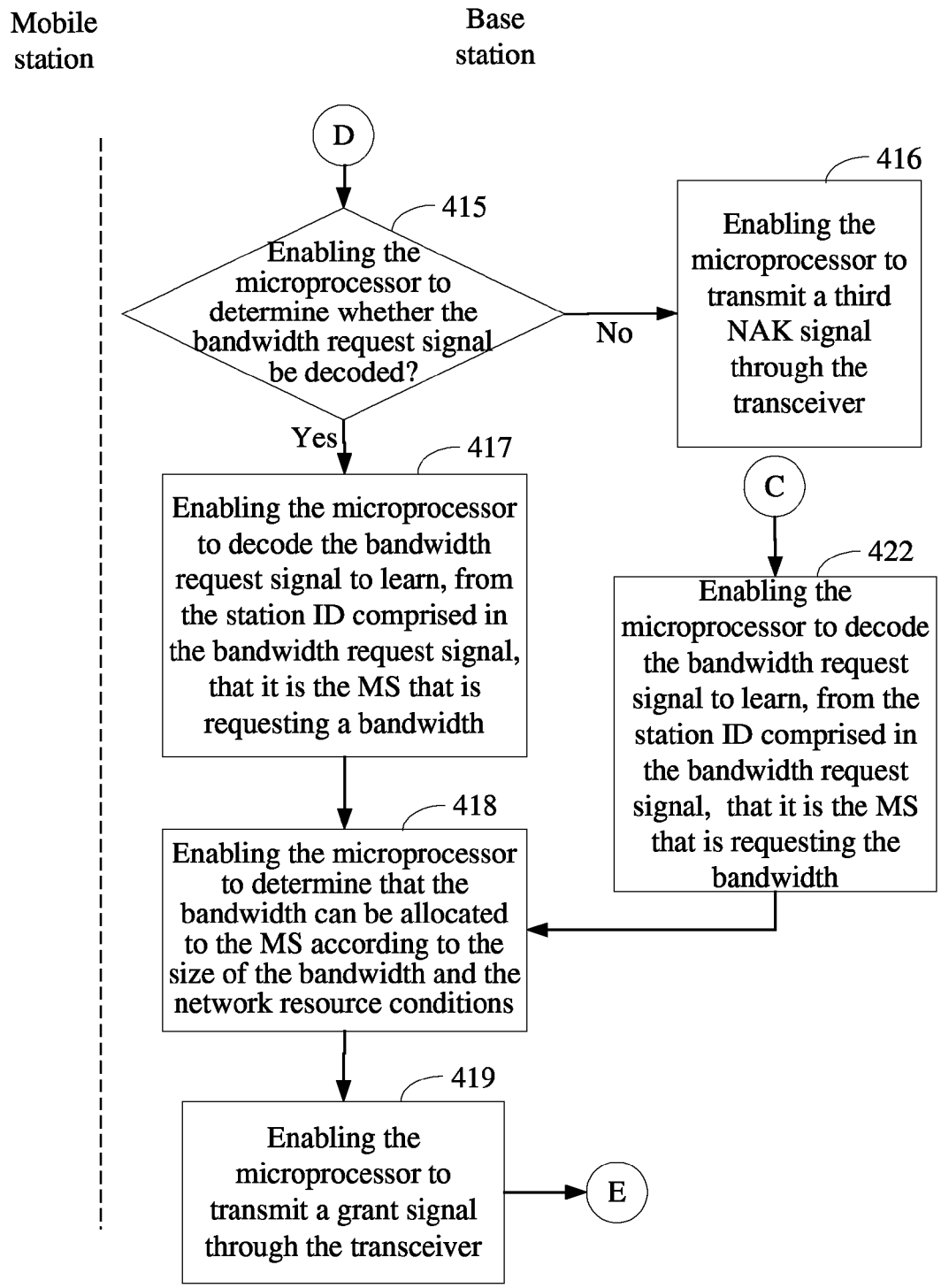

Then, referring to FIG. 5D, step 415 is executed to enable the microprocessor of the BS to determine whether the bandwidth request signal can be decoded. If the answer is no, then step 416 is executed to enable the microprocessor of the BS to transmit a third NAK signal to the MS through the transceiver so that, in response to the third NAK signal, the MS re-transmits a bandwidth request signal at least comprising a size of the requested bandwidth and the station ID corresponding to the MS to the BS.

Figure 5E:
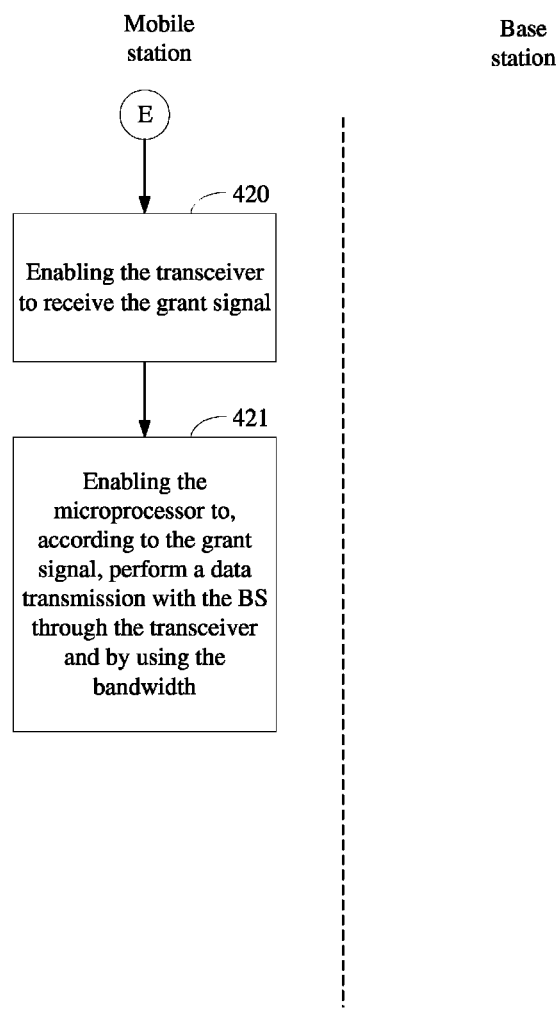

If the bandwidth request signal can be decoded by the microprocessor of the BS, then step 417 is executed to enable the microprocessor of the BS to learn, from the station ID comprised in the bandwidth request signal, that it is the MS that is requesting a bandwidth. Then, step 418 is executed to enable the microprocessor of the BS to determine that there are sufficient network resources available for allocating the bandwidth size requested by the MS according to the network resource conditions and the size of the requested bandwidth comprised in the bandwidth request signal. Afterwards, step 419 is executed to enable the microprocessor of the BS to transmit a grant signal to the MS through the transceiver. Referring next to FIG. 5E, step 420 is executed to enable the transceiver of the MS to receive the grant signal. Finally, step 421 is executed to enable the microprocessor of the MS to, according to the grant signal, perform a data transmission with the BS through the transceiver and by using the bandwidth.

Referring back to FIGS. 5C and 5D, if it is determined in step 411 that the quick access message can be decoded, the step 422 shown in FIG. 5D is executed to enable the microprocessor of the BS to learn, from the station ID comprised in the quick access message, that it is the MS that is requesting the bandwidth. Afterwards, step 418 is executed to enable the microprocessor of the BS to determine that there are sufficient network resources available for allocating the bandwidth size requested by the MS according to the network resource conditions and the size of the requested bandwidth comprised in the bandwidth request signal. Then, step 419 is executed to enable the microprocessor of the BS to transmit a grant signal to the MS through the transceiver. Referring next to FIG. 5E, step 420 is executed to enable the transceiver of the MS to receive the grant signal. Finally, step 421 is executed to enable the microprocessor of the MS to, according to the grant signal, perform a data transmission with the BS through the transceiver and by using the bandwidth.

Additionally, after the step 407, the transmission method of this embodiment may further comprise a step of enabling the microprocessor of the BS to conduct a CRC operation on the quick access message to generate a BS CRC code and to determine whether the MS CRC code and the BS CRC code are identical to each other. If the answer is yes, then it means that the quick access message is intact; otherwise, the quick access message is not intact. Whether this checking operation is conducted depends on practical requirements.

In addition to the aforesaid steps, the second example embodiment can also execute all the operations and functions set forth in the first example embodiment. How the second example embodiment executes these operations and functions will be readily appreciated by those of ordinary skill in the art based on the explanation of the first embodiment, and thus will not be further described herein.

According to the above description, the present invention can transmit a selected transmission sequence and a quick access message simultaneously in a frame to save the amount of control signals that need to be transmitted when a bandwidth is requested. This allows for an efficient use of the network resources and improves the overall transmission performance of the WiMAX wireless network, thereby addressing the disadvantages of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile station (MS) for use in a wireless network, the wireless network comprising a base station (BS), the MS attempting to request a bandwidth from the BS, the MS comprising:
   a storage configured to store transmission information and a sequence generating function;
   a microprocessor electrically connected to the storage and configured to:
      select a selected transmission sequence from a plurality of transmission sequences according to the sequence generating function;
      generate a quick access message according to the transmission information, the quick access message at least comprising a station identification (ID) corresponding to the MS; and
      embed pre-defined bit information into the selected transmission sequence according to the transmission information; and
   a transceiver electrically connected to the microprocessor and configured to transmit the selected transmission sequence and the quick access message to the BS in a frame so that the BS may allocate the bandwidth to the MS according to the pre-defined bit information and the station ID;
   wherein, the sequence generating function is:

$$RN=(a \times \text{current\_state}+p) \mod m$$

wherein RN is a serial number of the selected transmission sequence; a is a first predetermined parameter; current_state is information shared by the BS and the MS, wherein current state includes at least one of the station ID of the MS, a serial number of the frame, a flow ID of the MS, or a combination thereof; p is a second predetermined parameter; and m is a total number of the plurality of transmission sequences.

2. The MS as claimed in claim 1, wherein the storage is further configured to store a first sequence correspondence relationship, the microprocessor is further configured to conduct a shifting process on the first sequence correspondence relationship to generate a second sequence correspondence relationship according to the total number of the plurality of transmission sequences and the information shared by the BS and the MS, and the microprocessor is further configured to select the selected transmission sequence from the plurality of transmission sequences according to the second sequence correspondence relationship and the flow ID of the MS.

3. The MS as claimed in claim 1, wherein the microprocessor is further configured to conduct a cyclic redundancy check (CRC) operation on the quick access message to generate an MS CRC code and embed the MS CRC code into the quick access message.

4. The MS as claimed in claim 1, wherein the quick access message further comprises a size of the bandwidth, the BS is configured to confirm that the bandwidth is allocated to the MS according to the flow ID, the size of the bandwidth and the station ID, and transmit a grant signal after confirming that the bandwidth is allocated to the MS according to the flow ID, the size of the bandwidth and the station ID, the transceiver is further configured to receive the grant signal, the microprocessor is further configured to, according to the grant signal, perform a data transmission with the BS through the transceiver by using the bandwidth.

5. A transmission method for use in an MS, the MS being adapted for use in a wireless network, the wireless network comprising a BS, the MS comprising a storage, a microprocessor and a transceiver, the microprocessor being electrically connected to the storage and the transceiver respectively, the storage being configured to store transmission information and a sequence generating function, the MS attempting to request a bandwidth from the BS, the transmission method comprising the steps of:

(A) enabling the microprocessor to select a selected transmission sequence from a plurality of transmission sequences according to the sequence generating function;
   (B) enabling the microprocessor to generate a quick access message according to the transmission information, the quick access message at least comprising a station ID corresponding to the MS;
   (C) enabling the microprocessor to embed pre-defined bit information into the selected transmission sequence according to the transmission information; and
   (D) enabling the transceiver to transmit the selected transmission sequence and the quick access message to the BS in a frame so that the BS may allocate the bandwidth to the MS according to the pre-defined bit information and the station ID;
   wherein, the sequence generating function is:

$$RN=(a \times \text{current\_state}+p) \mod m$$

wherein RN is a serial number of the selected transmission sequence; a is a first predetermined parameter; current_state is information shared by the BS and the MS, wherein current state includes at least one of the station ID of the MS, a serial number of the frame, a flow ID of the MS, or a combination thereof; p is a second predetermined parameter; and m is a total number of the plurality of transmission sequences.

6. The transmission method as claimed in claim 5, wherein the storage further stores a first sequence correspondence relationship, and the step (A) includes the following steps of:
   enabling the microprocessor to conduct a shifting process on the first sequence correspondence relationship to generate a second sequence correspondence relationship according to the total number of the plurality of transmission sequences and the information shared by the BS and the MS; and
   enabling the microprocessor to select the selected transmission sequence from the plurality of transmission sequences according to the second sequence correspondence relationship and the flow ID of the MS.

7. The transmission method as claimed in claim 5, further comprising the steps of:
   enabling the microprocessor to conduct a CRC operation on the quick access message to generate an MS CRC code; and
   enabling the microprocessor to embed the MS CRC code into the quick access message.

8. The transmission method as claimed in claim 5, wherein the quick access message further comprises a size of the bandwidth, the BS is configured to confirm that the bandwidth is allocated to the MS according to the flow ID, the size of the bandwidth and the station ID, and transmit a grant signal after confirming that the bandwidth is allocated to the MS according to the flow ID, the size of the bandwidth and the station ID, the transmission method further comprising the following steps of:
enabling the transceiver to receive the grant signal; and
enabling the microprocessor to, according to the grant signal, perform a data transmission with the BS through the transceiver and by using the bandwidth.

9. A non-transitory computer storage medium storing a program for executing a transmission method for use in an MS, the MS being adapted for use in a wireless network, the wireless network comprising a BS, the MS comprising a storage, a microprocessor and a transceiver, the microprocessor being electrically connected to the storage and the transceiver respectively, the storage being configured to store transmission information and a sequence generating function, the MS attempting to request a bandwidth from the BS, the program comprising the following codes:
a code A for enabling the microprocessor to select a selected transmission sequence from a plurality of transmission sequences according to the sequence generating function;
a code B for enabling the microprocessor to generate a quick access message according to the transmission information, the quick access message at least comprising a station ID corresponding to the MS;
a code C for enabling the microprocessor to embed pre-defined bit information into the selected transmission sequence according to the transmission information; and
a code D for enabling the transceiver to transmit the selected transmission sequence and the quick access message to the BS in a frame so that the BS may allocate the bandwidth to the MS according to the pre-defined bit information and the station ID;
wherein, the sequence generating function is:

$$RN=(a\times\text{current\_state}+p)\bmod m$$

wherein RN is a serial number of the selected transmission sequence; a is a first predetermined parameter; current_state is information shared by the BS and the MS, wherein current state includes at least one of the station ID of the MS, a serial number of the frame, a flow ID of the MS, or a combination thereof; p is a second predetermined parameter; and m is a total number of the plurality of transmission sequences.

10. The non-transitory computer storage medium as claimed in claim 9, wherein the storage further stores a first sequence correspondence relationship, and the code A includes the following codes of:
a code I for enabling the microprocessor to conduct a shifting process on the first sequence correspondence relationship to generate a second sequence correspondence relationship according to the total number of the plurality of transmission sequences and the information shared by the BS and the MS; and
a code J for enabling the microprocessor to select the selected transmission sequence from the plurality of transmission sequences according to the second sequence correspondence relationship and the flow ID of the MS.

11. The non-transitory computer storage medium as claimed in claim 9, wherein the program further comprises the following codes:
a code E for enabling the microprocessor to conduct a CRC operation on the quick access message to generate an MS CRC code; and
a code F for enabling the microprocessor to embed the MS CRC code into the quick access message.

12. The non-transitory computer storage medium as claimed in claim 9, wherein the quick access message further comprises a size of the bandwidth, the BS is configured to confirm that the bandwidth is allocated to the MS according to the flow ID, the size of the bandwidth and the station ID, and transmit a grant signal after confirming that the bandwidth is allocated to the MS according to the flow ID, the size of the bandwidth and the station ID, the program further comprises the following codes:
a code G for enabling the transceiver to receive the grant signal; and
a code H for enabling the microprocessor to, according to the grant signal, perform a data transmission with the BS through the transceiver and by using the bandwidth.

13. A BS for use in a wireless network, the wireless network comprising an MS, the MS attempting to request a bandwidth from the BS and transmitting a selected transmission sequence and a quick access message in a frame, the selected transmission sequence comprising pre-defined bit information, and the quick access message at least comprising a station ID corresponding to the MS, the BS comprising:
a storage, being configured to store network resource condition of the wireless network and a sequence generating function;
a transceiver, being configured to receive the selected transmission sequence and the quick access message; and
a microprocessor, being electrically connected to the storage and the transceiver, and configured to:
decode the selected transmission sequence according to the sequence generating function to learn that a station having the pre-defined bit information is requesting the bandwidth;
decode the quick access message to obtain the station ID;
determine that the station is the MS according to the station ID; and
determine that the bandwidth is allocated to the MS according to the network resource condition;
wherein, the sequence generating function is:

$$RN=(a\times\text{current\_state}+p)\bmod m$$

wherein RN is a serial number of the selected transmission sequence; a is a first predetermined parameter; current_state is information shared by the BS and the MS, wherein current state includes at least one of the station ID of the MS, a serial number of the frame, a flow ID of the MS, or a combination thereof; p is a second predetermined parameter; and m is a total number of the plurality of transmission sequences.

14. The BS as claimed in claim 13, wherein the quick access message comprises an MS CRC code generated according to the quick access message, the microprocessor is further configured to conduct a CRC operation on the quick access message to generate a BS CRC code and configured to determine that the MS CRC code and the BS CRC code are identical to each other to confirm that the quick access message is intact.

15. The BS as claimed in claim 13, wherein the microprocessor is further configured to generate a grant signal after determining that the bandwidth is allocated to the MS, and the transceiver is further configured to transmit the grant signal to the MS to inform the MS that the bandwidth is used to perform a data transmission with the BS.

16. A transmission method for use in a BS, the BS being adapted for use in a wireless network and comprising a storage, a transceiver and a microprocessor, the microprocessor being electrically connected to the storage and the transceiver, the storage being configured to store network resource condition of the wireless network and a sequence generating function, the wireless network comprising an MS, the MS attempting to request a bandwidth from the BS and transmitting a selected transmission sequence and a quick access message in a frame, the selected transmission sequence comprising pre-defined bit information, and the quick access message at least comprising a station ID corresponding to the MS, the transmission method comprising the steps of:

(A) enabling the transceiver to receive the selected transmission sequence and the quick access message;
(B) enabling the microprocessor to decode the selected transmission sequence according to the sequence generating function to learn that a station having the pre-defined bit information is requesting the bandwidth;
(C) enabling the microprocessor to decode the quick access message to obtain the station ID;
(D) enabling the microprocessor to determine that the station is the MS according to the station ID; and
(E) enabling the microprocessor to determine that the bandwidth is allocated to the MS according to the network resource condition;

wherein, the sequence generating function is:

$$RN=(a\times\text{current\_state}+p)\bmod m$$

wherein RN is a serial number of the selected transmission sequence; a is a first predetermined parameter; current_state is information shared by the BS and the MS, wherein current state includes at least one of the station ID of the MS, a serial number of the frame, a flow ID of the MS, or a combination thereof; p is a second predetermined parameter; and m is a total number of the plurality of transmission sequences.

17. The transmission method as claimed in claim 16, wherein the quick access message comprises an MS CRC code generated according to the quick access message, the transmission method further comprises the steps of:
enabling the microprocessor to conduct a CRC operation on the quick access message to generate a BS CRC code; and
enabling the microprocessor to determine that the MS CRC code and the BS CRC code are identical to each other to confirm that the quick access message is intact.

18. The transmission method as claimed in claim 16, further comprising the steps of:
enabling the microprocessor to generate a grant signal after determining that the bandwidth is allocated to the MS; and
enabling the transceiver to transmit the grant signal to the MS to inform the MS that the bandwidth is used to perform a data transmission with the BS.

19. A non-transitory computer storage medium storing a program for executing a transmission method for use in a BS, the BS being adapted for use in a wireless network and comprising a storage, a transceiver and a microprocessor, the microprocessor is electrically connected to the storage and the transceiver, the storage is configured to store network resource condition of the wireless network and a sequence generating function, the wireless network comprising an MS, the MS attempting to request a bandwidth from the BS and transmitting a selected transmission sequence and a quick access message in a frame, the selected transmission sequence comprising pre-defined bit information, and the quick access message at least comprising a station ID corresponding to the MS, the program comprising the following codes:

a code A for enabling the transceiver to receive the selected transmission sequence and the quick access message;
a code B for enabling the microprocessor to decode the selected transmission sequence according to the sequence generating function to learn that a station having the pre-defined bit information is requesting the bandwidth;
a code C for enabling the microprocessor to decode the quick access message to obtain the station ID;
a code D for enabling the microprocessor to determine that the station is the MS according to the station ID; and
a code E for enabling the microprocessor to determine that the bandwidth is allocated to the MS according to the network resource condition;

wherein, the sequence generating function is:

$$RN=(a\times\text{current\_state}+p)\bmod m$$

wherein RN is a serial number of the selected transmission sequence; a is a first predetermined parameter; current_state is information shared by the BS and the MS, wherein current state includes at least one of the station ID of the MS, a serial number of the frame, a flow ID of the MS, or a combination thereof; p is a second predetermined parameter; and m is a total number of the plurality of transmission sequences.

20. The non-transitory computer storage medium as claimed in claim 19, wherein the quick access message comprises an MS CRC code generated according to the quick access message, and the program further comprises the following codes:
a code F for enabling the microprocessor to conduct a CRC operation on the quick access message to generate a BS CRC code; and
a code G for enabling the microprocessor to determine that the MS CRC code and the BS CRC code are identical to each other to confirm that the quick access message is intact.

21. The non-transitory computer storage medium as claimed in claim 19, wherein the program further comprises the following codes:
a code H for enabling the microprocessor to generate a grant signal after determining that the bandwidth is allocated to the MS; and
a code I for enabling the transceiver to transmit the grant signal to the MS to inform the MS that the bandwidth is used to perform a data transmission with the BS.

* * * * *